US009276775B2

(12) United States Patent
Anantharaman et al.

(10) Patent No.: US 9,276,775 B2
(45) Date of Patent: Mar. 1, 2016

(54) IDENTITY-BASED INTERACTIVE RESPONSE MESSAGE

(75) Inventors: Sundaram Anantharaman, Bellevue, WA (US); Sameer Dilip Bedekar, Issaquah, WA (US)

(73) Assignee: Microsoft Patent Licensing, LLC, Redmond, WA (US)

( * ) Notice: Subject to any disclaimer, the term of this patent is extended or adjusted under 35 U.S.C. 154(b) by 1958 days.

(21) Appl. No.: 11/850,487

(22) Filed: Sep. 5, 2007

(65) Prior Publication Data

US 2009/0059897 A1 Mar. 5, 2009

(51) Int. Cl.
*H04L 12/66* (2006.01)
*H04L 12/56* (2006.01)
*H04M 3/42* (2006.01)
*H04M 3/493* (2006.01)
*H04M 3/533* (2006.01)

(52) U.S. Cl.
CPC ........... *H04L 12/66* (2013.01); *H04M 3/42059* (2013.01); *H04M 3/493* (2013.01); *H04M 3/53391* (2013.01)

(58) Field of Classification Search
CPC ..................... H04M 3/53391; H04M 3/42059; H04M 3/53383; H04M 3/42017; H04M 3/533; H04M 3/42153; H04M 3/53316; H04M 3/53308; H04M 3/53333; H04L 63/0245; H04L 67/306; H04L 67/303
USPC .......... 370/352, 231, 356, 400; 709/206, 224, 709/228; 704/275; 379/355.02, 355.07, 76, 379/88.19, 142.01, 142.06, 88.16, 207.15, 379/67.1; 455/413, 412.1, 412.2, 415
See application file for complete search history.

(56) References Cited

U.S. PATENT DOCUMENTS

| | | | |
|---|---|---|---|
| 5,559,860 A | 9/1996 | Mizikovsky | |
| 5,579,472 A | 11/1996 | Keyworth, II et al. | |
| 5,737,393 A | 4/1998 | Wolf | |
| 6,014,428 A | 1/2000 | Wolf | |
| 6,097,793 A * | 8/2000 | Jandel | H04L 12/5692 379/201.01 |
| 6,324,279 B1 * | 11/2001 | Kalmanek, Jr. | H04L 12/5695 370/389 |
| 6,628,194 B1 | 9/2003 | Hellebust et al. | |
| 6,891,934 B1 | 5/2005 | Gao et al. | |
| 6,970,906 B1 | 11/2005 | Parsons et al. | |
| 7,024,461 B1 | 4/2006 | Janning et al. | |
| 7,277,529 B1 * | 10/2007 | Wuthnow et al. | 379/88.14 |
| 7,551,727 B2 * | 6/2009 | Howell et al. | 379/88.14 |
| 7,599,473 B2 * | 10/2009 | Michael et al. | 379/76 |

(Continued)

OTHER PUBLICATIONS

Lawrence R. Robiner. The Role of Voice Processing in Telecommunications. http://ieeexplore.ieee.org/iel2/1137/7989/00341554.pdf?isNumber=. Last accessed on May 7, 2007.

(Continued)

*Primary Examiner* — Wutchung Chu
(74) *Attorney, Agent, or Firm* — Tom Wong; Micky Minhas

(57) ABSTRACT

A system that can deliver a tailored message based upon characteristics surrounding an incoming communication. In one aspect, the system is a targeted voice-mail system that has the capability to provide a unique voice-mail depending upon the communication characteristics which include the identity of caller or the initiator of the call, whether a specific identity or within a group, the identity for which the call is targeted, and the intent of the caller. Additionally, other contextual factors can be considered in generating, locating and/or rendering a tailored response message.

19 Claims, 13 Drawing Sheets

(56) References Cited

U.S. PATENT DOCUMENTS

| | | | |
|---|---|---|---|
| 7,623,633 B2* | 11/2009 | Gatzke et al. | 379/88.12 |
| 8,000,685 B2* | 8/2011 | Benco et al. | 455/413 |
| 8,320,535 B2* | 11/2012 | Alperin et al. | 379/88.14 |
| 2002/0118807 A1* | 8/2002 | Pedersen | 379/142.01 |
| 2002/0144136 A1* | 10/2002 | Stornetta et al. | 713/200 |
| 2003/0105827 A1* | 6/2003 | Tan et al. | 709/206 |
| 2003/0112931 A1 | 6/2003 | Brown et al. | |
| 2003/0112941 A1* | 6/2003 | Brown | H04M 3/2218 379/196 |
| 2003/0112944 A1* | 6/2003 | Brown | H04M 3/42 379/201.01 |
| 2003/0156700 A1* | 8/2003 | Brown | H04M 3/436 379/210.02 |
| 2003/0210771 A1 | 11/2003 | Broussard et al. | |
| 2004/0006478 A1* | 1/2004 | Alpdemir et al. | 704/275 |
| 2004/0218734 A1* | 11/2004 | Gilbert et al. | 379/76 |
| 2005/0089149 A1* | 4/2005 | Elias | 379/88.13 |
| 2005/0129190 A1* | 6/2005 | Euscher et al. | 379/88.13 |
| 2006/0078105 A1* | 4/2006 | Korn et al. | 379/210.02 |
| 2006/0182245 A1* | 8/2006 | Steinmetz | G06Q 10/10 379/127.01 |
| 2006/0239419 A1* | 10/2006 | Joseph et al. | 379/67.1 |
| 2007/0047718 A1* | 3/2007 | Idler et al. | 379/235 |
| 2007/0263791 A1* | 11/2007 | Alperin | H04M 3/436 379/67.1 |
| 2008/0005229 A1* | 1/2008 | Cohen et al. | 709/203 |
| 2008/0133761 A1* | 6/2008 | Polk | 709/228 |
| 2008/0140785 A1* | 6/2008 | Farrenkopf et al. | 709/206 |
| 2008/0167014 A1* | 7/2008 | Novick et al. | 455/413 |
| 2008/0182548 A1* | 7/2008 | Pattison et al. | 455/406 |
| 2008/0259918 A1* | 10/2008 | Walker et al. | 370/389 |
| 2009/0239507 A1* | 9/2009 | Sigmund et al. | 455/413 |
| 2009/0310769 A1* | 12/2009 | Ramakrishnan et al. | 379/201.02 |

OTHER PUBLICATIONS

Application Directory. TeleFlow Voice Application Softwar. http://teleflowhype.com/appdirectory.pdf. Last accessed on May 7, 2007.

* cited by examiner

CONTAINER LIST

| MASK | TYPE | CONTAINER |
|---|---|---|
| ADRIAN | USER | CT100 |
| SAM | USER | CT100 |
| SUNDAR | USER | CT100 |
| ABC.COM | DOMAIN | CT200 |
| ***** | FEDERATED ENTERPRISE | CT300 |
| ***** | FEDERATED PIC | CT400 |
| ***** | EVERYONE | CT400 |

FIG. 6A

CATEGORY LIST

| CATEGORY ID | CATEGORY NAME |
|---|---|
| CA1 | NORMAL |
| CA2 | URGENT |
| CA3 | BUSINESS |

FIG. 6B

CALLEE LIST

| CALLEE ID | MASK |
|---|---|
| ME1 | +14255551212 |
| ME2 | SIP: JDOE@ABC.COM |
| ME3 | SIP: JOHN@HOME.COM |

FIG. 6C

MESSAGE LIST

| MESSAGE ID | FILE | TEXT |
|---|---|---|
| M1 | M1.WAV | ABC |
| M2 | M2.WAV | ABC |
| M3 | M3.WAV | ABC |
| M4 | M4.WAV | ABC |
| ⋮ | ⋮ | ⋮ |
| $M_N$ | STREAM AUDIO/VIDEO | ABC |

FIG. 9A

RESULT TABLE

| CATEGORY | CONTAINER | TO | MESSAGE |
|---|---|---|---|
| CA1 | CT100 | ME1 | M1 |
| CA1 | CT200 | ME1 | M2 |
| CA1 | CT300 | ME1 | M3 |
| CA2 | CT100 | ME1 | M4 |
| CA2 | CT100 | ME2 | M5 |

FIG. 9B

IDENTITY-BASED INTERACTIVE RESPONSE MESSAGE

BACKGROUND

The Internet has spawned many communication mediums that continue to become increasingly popular and widespread. The ever-growing popularity of mobile devices such as internet-capable smartphones has contributed to this continued popularity. These communication mediums include but are not limited to electronic mail (email), Voice-over-Internet protocol (VoIP), instant messaging (IM) and text messaging over a network of two or more computers or network connectable, processor-based devices.

VoIP, aka broadband telephony, refers to a protocol of routing voice conversations via the Internet or any other IP-based network. While VoIP is technologically advanced in view of conventional telephony systems, it retains some of pitfalls of the traditional systems. For example, spam or unsolicited communications continue to plague these systems. As well, although technologically advanced, VoIP systems, and particularly VoIP automated answering machines, lack personalization and programmability.

Companies that provide VoIP service are commonly referred to as providers, and protocols which are used to carry voice signals over the IP network are commonly referred to as 'Voice over IP' or 'VoIP' protocols. Some cost savings of the VoIP protocol can be attributed to a single network to carry voice and data, especially where users have existing underutilized network capacity that can carry VoIP at no additional cost. Popularity of the use of VoIP communication mechanisms is on the rise as VoIP phone calls are often free to both parties, while VoIP to conventional public switched telephone networks (PSTN), may have a cost which is often charged to the VoIP user in these scenarios.

VoIP can facilitate tasks that may be more difficult to achieve using traditional networks. For example, an ability to transmit more than one telephone call via a single broadband-connected telephone line is achievable with today's VoIP protocol. One benefit of this feature is that it easily enables addition of an extra telephone line to a home or office. Moreover, incoming phone calls can be automatically routed to a VoIP phone, regardless of the location of the network connection. Thus, a user can employ a VoIP phone to make and receive calls anywhere the Internet is available.

Consistent with traditional PSTN systems, VoIP features most often include features such as 3-way calling, call forwarding, auto-redial, caller ID as well as voice-mail. However, unlike traditional PSTN systems, these features are most often included free of charge with the base connection. Additionally, VoIP phones can integrate with other services available over the Internet, such as video conferencing, message and data file exchange in parallel with the conversation, audio conferencing, PIM (personal information manager) data management, etc.

Although VoIP systems are technologically advanced as related to conventional telephony systems, to date, features have been generally limited to the features of traditional systems. For example, VoIP voice-mail, in its simplest form mimics the functions of a traditional answering machine. More particularly, it effectively uses a computerized system to generate a user (or system) programmed greeting in response to a missed or unanswered call. While greetings may be customized to convey information desired by a user, today's VoIP systems do not leverage the power of the computer in offering voice-mail features.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a system that can tailor a response message (e.g., voice-mail message) based upon factors associated with an incoming communication. For example, a response message can be based upon 'identity' of the caller and/or callee whereby different information can be conveyed based upon disparate identities. It is to be understood that a particular user (e.g., caller or callee) can have multiple 'identities' based upon criteria surrounding the user at a particular moment in time.

For example, a user can have identities associated to 'work' or 'home' such as, but not limited to 'co-worker,' 'manager,' 'customer,' 'employee,' 'parent,' 'spouse,' 'child,' 'friend,' etc. Based upon a combination of caller and callee identities, the system can tailor a response message so as to personalize the information conveyed to a caller. Additionally, contextual factors such as location, date, time of day, personal information manager (PIM) data, engaged activity or the like can be employed to further personalize and determine an appropriate customized response to a caller.

In a particular example, Voice-over-Internet Protocol (VoIP), the system can analyze an incoming communication to automatically determine identity of the caller and the callee. In one embodiment, this analysis can be effectuated by evaluating the SIP (session initiation protocol) header to thereafter determine an appropriate identity. Pre-defined tables can be used to facilitate determination of the appropriate identities.

Still further, intention (or priority) of the communication can be used to further assist in determining a customized response message. For example, header information can be used to determine if a communication is 'urgent,' 'normal,' 'business-related,' 'personal' or the like. Additional policies (or artificial intelligence) can be used to determine (or infer) an appropriate tailored message to render.

A policy component (e.g., rules-based decision) can be employed to enforce preferences with regard to message selection. In yet another aspect thereof, an artificial intelligence component (e.g., machine learning and reasoning) is provided that employs a probabilistic and/or statistical-based analysis to prognose or infer an action that a user desires to be automatically performed.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

FIGS. 6A-6C illustrate an example Container List, Category List and Callee List respectively in accordance with an aspect of the innovation.

FIGS. 9A-9B illustrate an example Message List and Result Table respectively in accordance with embodiments of the innovation.

DETAILED DESCRIPTION

Figure 1:
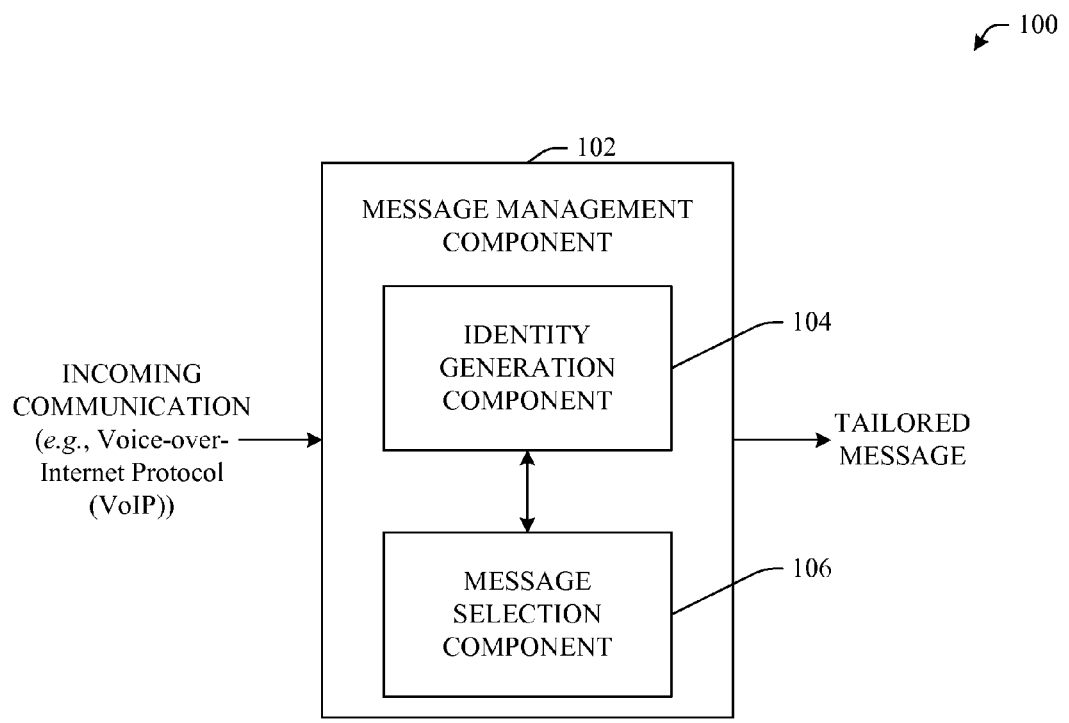
FIG. 1 illustrates an example system that facilitates tailoring response messages in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates an example system 100 that employs a message management component 102 to render a personalized or tailored message in accordance with aspects of the innovation. In operation, an incoming communication, (e.g., voice-over-Internet protocol (VoIP) communication) can be received and processed by the message management component 102 within a mobile device. Accordingly, if the callee is not available, as illustrated, a tailored message (e.g., voice-mail) can be generated (and/or retrieved) and rendered to the caller. While many of the aspects described herein are directed to VoIP communication, it is to be understood that the features, functions and benefits described herein can be applied to most any communication protocol, including but not limited to email, instant messaging (IM), text messaging, etc., without departing from the spirit and scope of this specification.

As shown in FIG. 1, the system 100 can include an identity generation component 104 and a message selection (or generation) component 106. Together, these components are able to establish identity of the caller and thereby personalize a message to the caller as a function of the identity. Still further, the system 100 can personalize the message based upon other factors, including but not limited to, callee identity, communication priority (e.g., urgent, normal), context, or the like. In other words, the container-based concepts of the innovation can also be extrapolated to the target or initiator identity. In one aspect, the containers can be used to group together various caller identities into containers. Similarly, the same can be accomplished for the target (callee) identities. For example, a work phone number and work URI can be put into the same container. Likewise, a home number and home identity can be stored within another container. These aspects will be better understood upon a review of the figures that follow.

Continuing a discussion of FIG. 1, the identity generation component 104 can establish a current 'identity' of a user. As used herein, 'identity' can be a digital identity, physiological identity, role-based identity, contextually-based identity or the like. For example, a single user can have multiple identities, each of which is applicable based upon a specific set of circumstances. In a simple example, suppose James and Michelle are married, here, when James calls Michelle his identity is a 'husband' or 'spouse.' However, when James calls someone at his place of employment, his identity can be 'colleague,' 'co-worker,' or the like.

Similarly, the callee can have multiple 'identities' based upon a specific set of circumstances. As described above, when James calls Michelle, her 'identity' can be described as 'wife' or 'spouse.' This identity can change relative to caller's identity or even with respect to contextual factors. In another example, if James is in his office, his 'identity' can be a professional one whereas when at home, he can be a 'homeowner,' 'neighbor,' or the like. As will be appreciated, the aforementioned examples are very simplistic in nature and are merely provided to add context to the innovation. As such, the examples are not intended to limit the innovation in any way. Rather, it is to be understood and appreciated that most any factors can be processed by the identity generation component 104 in order to establish caller (and/or callee) identity.

The message selection component 106 can facilitate selection of an appropriate message based upon a specific set of criteria which can include, but is not limited to include, caller identity, callee identity, communication priority, context, communication content, or the like. As will be described infra, the message selection component 106 can process the criteria and thereafter select an appropriate message from a data store or other storage facility (not shown). In other examples, the message selection component 106 can facilitate generation of a message based upon the criteria. Here, the personalized or tailored message can be established or generated to include information specific to the identity of the caller (and/or callee) as well as to the specific context or priority.

In operation, the message selection component 106 enables response (e.g., voice-mail) messages to be tailored in that the messages can reveal information which is helpful or more directed to a particular person, or situation. For instance, a message to a callee's wife might reveal different information as compared to a callee's co-worker. By way of further example, the message to the callee's wife might reveal that he is going to be late from work and that she should go ahead and have dinner without him. By contrast, an example message to a co-worker might reveal that he is currently working on a project in Conference Room A and can be reached at extension #123 in the event that the call/issue cannot wait.

Figure 2:
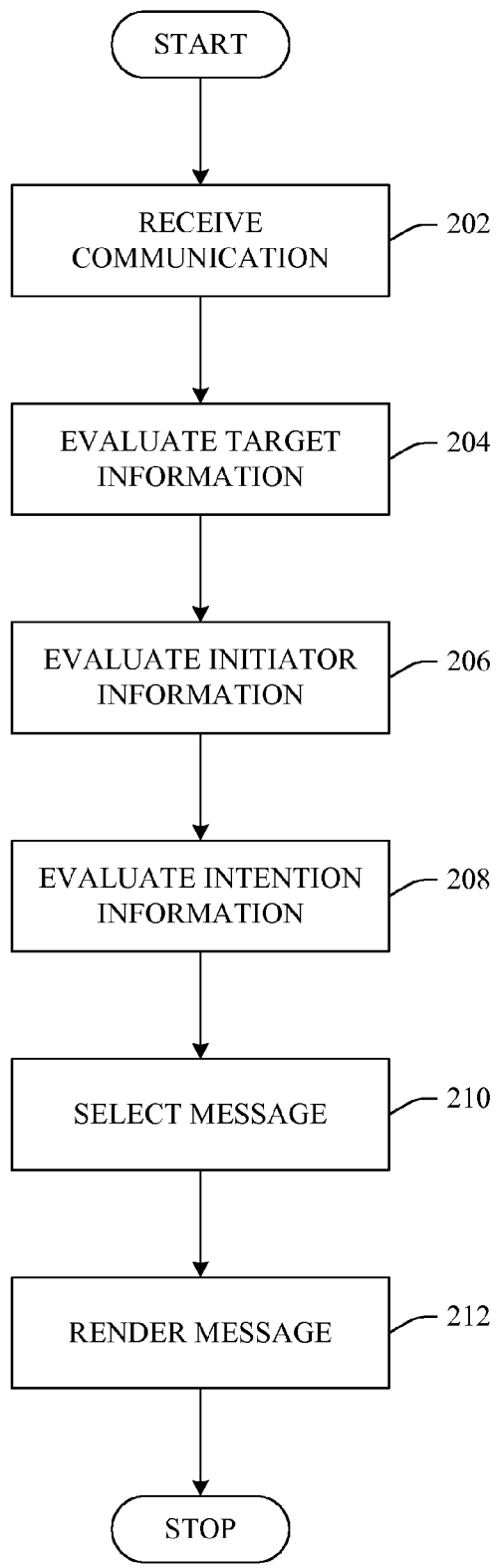
FIG. 2 illustrates an example flow chart of procedures that facilitate analyzing an incoming communication to select an appropriate message as a function of message-specific criteria in accordance with an aspect of the innovation.

FIG. 2 illustrates a methodology of managing personalized response messages in accordance with an aspect of the innovation. As stated above, it is to be understood that, in accordance with the innovation, the communication can be a cellular call, a VoIP call, an electronic mail correspondence (aka email), an IM, a text message, or the like. Essentially, the features functions and benefits of the innovation can be employed to personalized response messages based upon most any communication protocol. Although many of the examples included herein are directed to VoIP communications, it is to be understood that the innovation is intended to include these alternative communication protocols within the scope of this innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Referring now to FIG. 2, a communication is received, for example by a mobile device such as a VoIP-equipped phone. The methodology of FIG. 2 illustrates just one example of tailoring or personalizing a message in accordance with an aspect of the innovation. Although this example employs a specific number of factors in selecting a message, it is to be understood and appreciated that additional factors can be considered in order to select a personalized message. These alternative aspects are to be included within the scope of this disclosure and claims appended hereto.

At 204, target information is evaluated. Here, the callee 'identity' can be evaluated. More particularly, in one aspect, the SIP (session initiation protocol) header of the VoIP communication can be evaluated in order to determine a target (or callee) identity. It is to be understood that SIP is but one of the leading signaling protocols employed in VoIP communications. More particularly, SIP is an application-layer control (or signaling) protocol used in creating, modifying, and terminating sessions with one or more VoIP participants. While this example is directed to evaluating SIP header information to establish callee identity, other protocols can be employed without departing from the scope of this specification. It is to be understood that the herein described solution will work with most any VoIP signaling protocol that supports extensible metadata (for intent) and addresses based on a URI (to and from). Though the description provides implementations of SIP-based systems, other signaling channels could be but one of the extrapolations without departing from the spirit and scope of the innovation.

In one example, suppose the SIP header identifies the target as james@home.com. Here, this address identifies at least some characteristics of the 'identity' of James—e.g., at home, not work, casual, etc. In contrast, if the SIP header identifies an address as james@abccompany.com, this is an indication that James is being contacted at his place of employment. Thus, the 'identity' is more enterprise-related or professional in nature.

In addition to identifying the target (or callee) information, at 206, the initiator (or caller) information can be established and evaluated. More particularly, the 'identity' of the initiator can be established at 206. Again, a factor such as email address domain can be used to establish a particular 'identity' of the caller. In both of the aforementioned examples, it is to be understood that situational or external (e.g., contextual) factors can be employed to establish 'identity' of a callee or caller. Factors such as, but not limited to, time of day, day of week, device type, device location, device owner (e.g., personal, enterprise owned) or the like can be employed to assist in determining 'identity.'

Continuing with the example methodology of FIG. 2, intention or priority can be evaluated at 208. By way of example, this message priority can be ranked on most any scale capable of conveying intention of the user. In examples, priority can be 'low,' 'medium,' 'high,' 'urgent,' 'normal,' among others. In operation, the gathered information from acts 204, 206 and 208 can be employed personalize a response message.

At 210, the gathered information can be employed to select (or generate) a response message. For instance, pre-programmed rules (e.g., cross-reference tables) or machine learning and/or reasoning (MLR) mechanisms can be employed to select (or generate) an appropriate tailored message. The response message can be rendered (e.g., audibly played) to the caller at 212.

Figure 3:
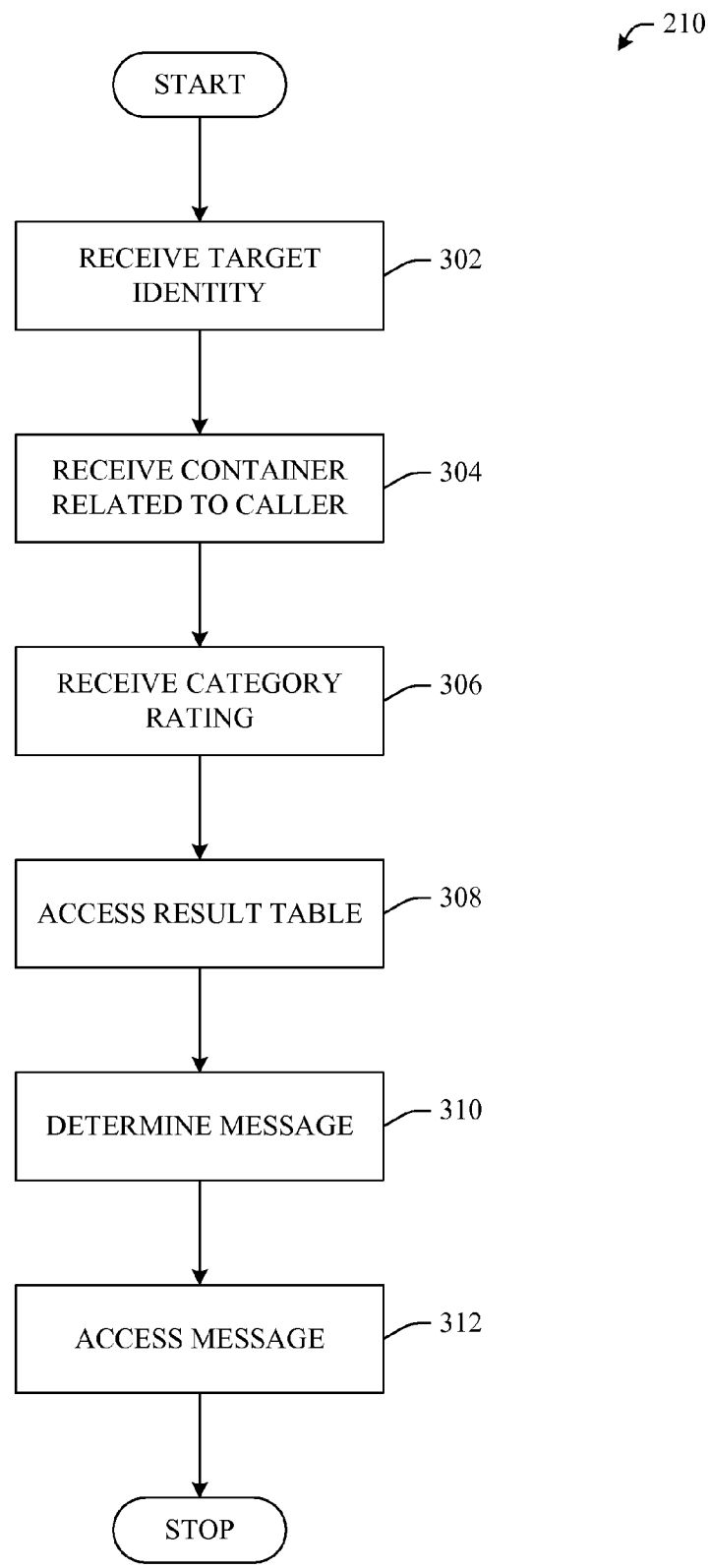
FIG. 3 illustrates an example flow chart of procedures that facilitate factor-specific selection of a tailored message in accordance with an aspect of the innovation.

Referring now to FIG. 3, an example methodology of a rule-based (or table-based) message lookup in accordance with an aspect of the innovation is shown. At 302, a target identity is received (or determined). For example, the target identity can be established by analyzing the SIP header of a VoIP communication data packet. Once, the target identity is established, it can be cross referenced to determine a relevant container at 304. In operation, and as will be described in greater detail infra, this container identification is used to later select an appropriate response greeting or message.

At 306, a category identification is received. As described above, the category identification defines priority of a message, for example, 'high,' 'medium,' 'low,' 'normal,' 'urgent,' etc. In aspects, this category identification can be defined, pre-programmed or inferred as a function of criteria related to the communication.

A result table or other suitable cross-reference can be accessed at 308. Here, the caller container and the category can be cross-referenced to determine an appropriate message at 310. Although the methodology of FIG. 3 only employs two characteristics to establish the message at 310, it is to be understood that other characteristics, including but not limited to, callee identity, location, date, time of day, device type or other contextual factors can be considered when determining the appropriate message at 3 10. At 312, the message can be accessed, for example from a cloud-based store or other suitable storage location. In yet other embodiments, an appropriate message can be dynamically generated (e.g., on-the-fly) in response to characteristics as well as other contextual factors.

FIGS. 4-10 illustrate components and subcomponents of the message management component 102 of FIG. 1. While some of these components are illustrated inclusive of others, it is to be understood that these components can be collocated, stand-alone, or otherwise incorporated into other components in accordance with aspects of the innovation. As such, these alternative aspects are to be included within the scope of this disclosure and claims appended hereto.

As described above, the subject innovation discloses a targeted messaging system. When a call is received in a user's absence or when the user is busy, the system can customize voice-mail greetings depending upon the remote user or remote users (as well as other factors), for example, immediate team mate(s), colleague(s) company-wide, customer(s), location, device type, date, time of day, engaged activity, or other contextual factors.

It is to be understood that, in order to deliver a customized voice-mail greeting the system can gather information and factors related to the caller and/or callee 'identity' deterministically. Traditional telephony systems lack the ability to provide this 'identity' information. The limitation arises from the fact that traditional telephony does not have any mechanism to identify the callee or the initiator of the call. Additionally, conventional telephone networks do not authenticate the user of the service but rather they only identify the device or the connection endpoint—telephone number.

In contrast, the subject innovation can authenticate a user's identity when they login or when they try to send any conversation-initiating request. This is irrespective of what software or hardware they use to communicate the communication system. Continuing with the aforementioned VoIP examples, SIP mandates that any conversation—initiating message (INVITE) populates the user identity as FROM header of the request. The receiver of this request can thus determine the initiator of the request by analyzing the FROM header in the request. The innovation can thus take advantage of this information about the initiator in order to deliver a customized voice-mail depending upon the remote user or initiator.

Figure 4:
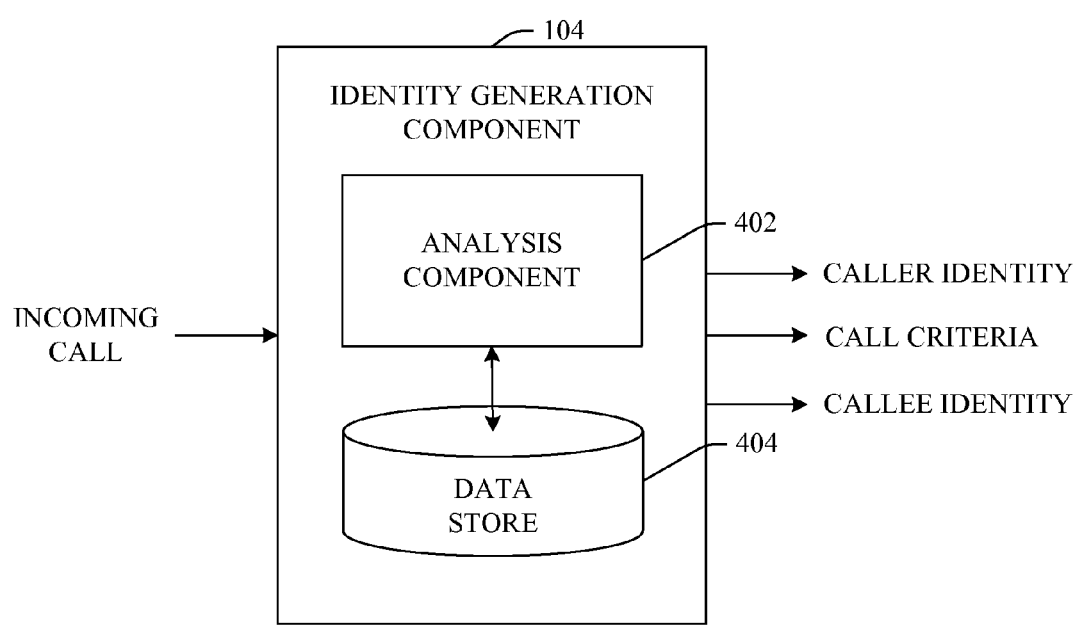
FIG. 4 illustrates an example block diagram of an identity generation component in accordance with an aspect of the innovation.

Referring now to FIG. 4, a block diagram of an identity generation component 104 is shown. Specifically, the identity information component 104 is shown to include an analysis component 402 and a data store 404. Together, these components can evaluate an incoming call (or other communication) to determine 'identity' information as well as other factors associated with the incoming communication.

As shown, in one aspect, the analysis component 402 can establish caller identity, callee identity as well as other call criteria (e.g., priority). A data store 404 can be employed to assist in determination of a specific 'identity.' As described above, the innovation enables multiple identities to correspond to any single physical user. As well, an 'identity' can be associated to a group, for example, an employee of ABC Company. Here, irrespective of the particular digital or physiological identity, the affiliation with the ABC Company can be used to determine a particular tailored message.

Figure 5:
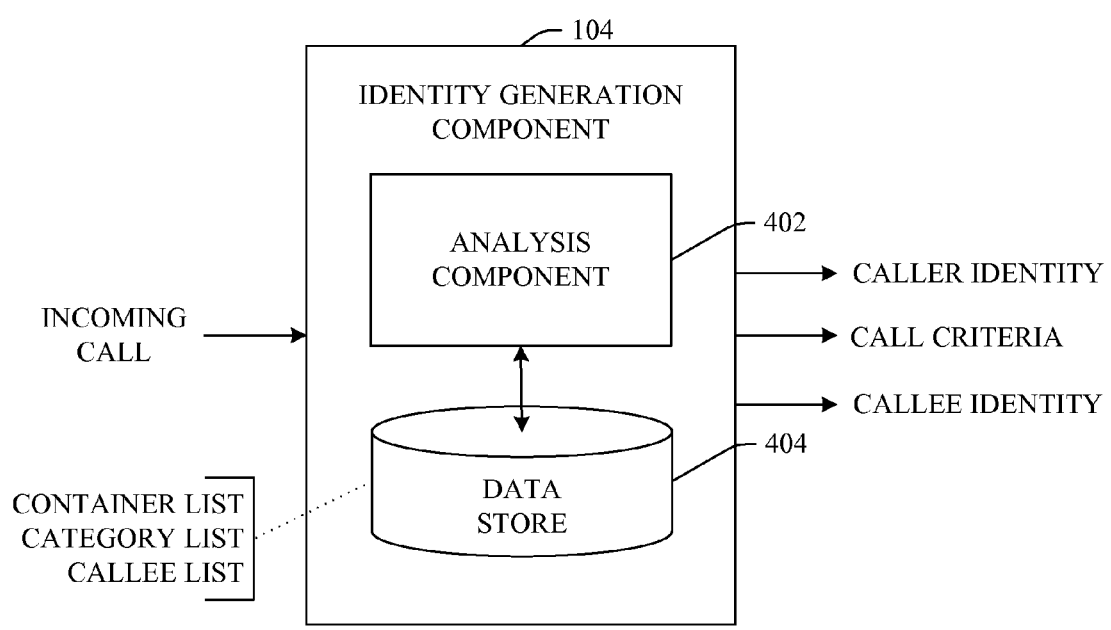
FIG. 5 illustrates an alternative block diagram of the identity generation component that illustrates tables employed by the analysis component in accordance with an aspect of the innovation.

In operation, in one embodiment as shown in FIG. 5, the data store 404 can be employed to cross-reference factors in order to establish a particular identity and/or category. By way of example, the analysis component 402 can evaluate the SIP header of an incoming VoIP communication in order to establish identity information. Particularly, as illustrated in FIGS. 6A-6C described infra, a container list, category list and callee list respectively can be used to establish these identities. These lists can be maintained within the data store 404.

In one aspect, the subject system can include a voice-mail system that employs an interactive voice response mechanism having a database backend which determines a voice message to play based on a number of factors. For instance, the system can determine the addressee of a call (or callee). For instance, the system can determine if the call is addressed to a user's work phone number, SIP identity, or personal identity.

Similarly, the system, via analysis component 402, can determine the initiator's or caller's identity. As described above, this identity can be digital, physiological or even affiliation-related. For instance, the identity can determine if the caller can be classified in a set of people. Continuing with the aforementioned example, the analysis component 402 can determine if the caller can be classified as a family member, or as a friend, or as a co-worker (e.g., ABC Company employee).

Still another factor that can be considered in tailoring a message is intent of the call (e.g., priority). Here, a determination can be made to establish if the caller has stated intent for the call. As described supra, this intent can be described or conveyed in most any manner including, but not limited to, urgent, confidential, or private.

The analysis component 402 can evaluate the above-noted criteria by way of the SIP proxy from the following headers in the SIP message. The 'TO' designation in the SIP header can be evaluated in order to determine the enterprise identity to which this is targeted. The 'FROM' designator can be evaluated in order to determine which container the caller belongs. And finally, the 'CATEGORY NAME' can be evaluated from an optional intention header in order to determine priority, which in turn is employed to determine which message to play. If this intention or priority does not exist, the system can default to a 'normal' (or other predefined) category as desired or appropriate.

Based on these factors, the system can determine which voice message to play. As will be shown in the figures that follow, the factors can be determined and ultimately cross-referenced in order to define a particular message to render.

As illustrated in FIGS. 4 and 5, the system employs a database 404 capable of correlating factors in determining the result message. Example database tables are illustrated in FIGS. 6A, 6B and 6C.

Referring first to FIG. 6A, a Container List table is shown in accordance with an aspect of the innovation. As illustrated, the container list table of FIG. 6A can describe which container a user (or caller) falls into. In this example, there are five types of container entries—'User,' 'Domain,' 'Federated Enterprise,' 'Federated PIC,' and 'Everyone.' These entries are listed in order of specificity. In other words, the evaluation starts at the most specific ('User') and moves to the least specific ('Everyone'). In the example of FIG. 6A, if the call is from Adrian, the caller will fall into CT100 because Adrian@ABCCompany.com has a 'User' entry that shares the same domain as the callee. If the call is for Bill@ABCCompany.com, the caller will fall into CT200 as the domain entry is the most specific. A call from Bob@XYZCompany will fall into the CT400 container.

FIG. 6B illustrates a Category List that defines example category names associated to a Category ID. As described above, this Category ID specifies the category that a call falls into based on the caller's intention as stated in the caller-intention header. As will be described infra, the Category ID can be used in the Result Table to select a message.

FIG. 6C illustrates an example Callee List that determines which of the identities the call was intended to reach. In other words, as can be determined by evaluation of the SIP header in one example, the identity of the callee can be determined in order to further establish a descriptive factor related to the call (or communication). As with the Container List and the Category List, the Callee Identity can be used when evaluating a Result Table to determine an appropriate message.

Figure 7:
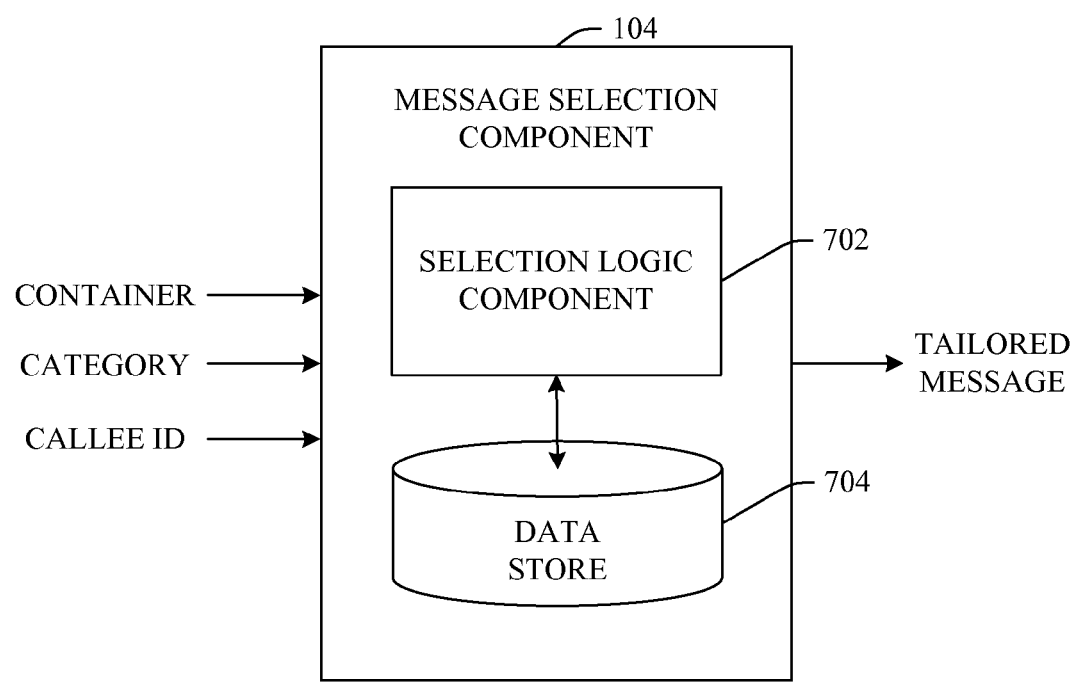
FIG. 7 illustrates an example message selection component in accordance with embodiments of the innovation.

Referring now to FIG. 7, a block diagram of an example message selection component 104 is shown. Generally, the message selection component 104 can receive information from the analysis component (e.g., 402 of FIG. 4) such as 'container,' 'category,' and 'callee' information. As shown, the message selection component 104 can include a selection logic component 702 that uses a data store 704 to select an appropriate or desired tailored message.

Figure 8:
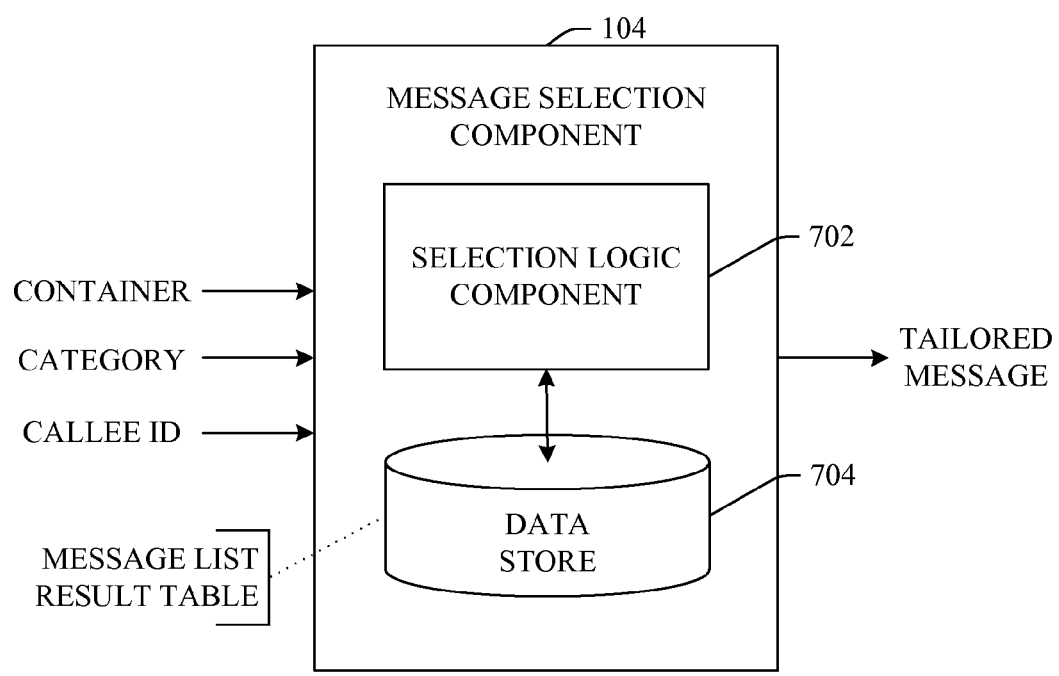
FIG. 8 illustrates an alternative block diagram of the message selection component that illustrates tables employed by the selection logic component in accordance with an aspect of the innovation.

FIG. 8 illustrates that data store 704 can include a Message List and a Result Table that correlates factors in order to determine an appropriate tailored message. While data store 704 is illustrated inclusive of the message selection component 104, it is to be understood that this data store can be combined and collocated with data store 404 of FIG. 4 without departing from the spirit and scope of the innovation. As well, each of these data store components (404, 704) can be remotely located (e.g., cloud-based) as desired. Examples of a Message List and Result Table are shown in FIGS. 9A and 9B respectively.

Referring to FIG. 9A, as shown, the Message List can include 1 to N messages, where N is an integer. The example Message List table simply correlates a Message ID with a wave audio (.WAV) format file or other file to be played. While the example of FIG. 9A employs .WAV files, it is to be understood that the message file can be of other various (e.g., audio, video, text) formats—WMA, WAV, MP3, MPEG, real time streaming from a third party site, etc.

FIG. 9B illustrates a result table that cross-references the gathered factors (e.g., category, container, callee) in order to determine an appropriate message. Here, the message selection logic component 702 can employ the result table to determine an appropriate message. In doing so, the selection logic component 702 can employ pre-programmed rules, MLR as well as context awareness in making an appropriate determination. Each of these components will be described in greater detail with reference to FIG. 10 that follows.

The example Result List of FIG. 9B shows the final voice-mail that is played for the combination of caller, callee, and intent. In this example, if Adrian calls a user's work number with a normal category, then the system will play M1.wav to Adrian. It is to be understood that the aforementioned examples are provided merely to add perspective to the innovation and are not intended to limit the scope of the innovation in any way. Rather, countless examples exist which are to be included within the scope of this disclosure and claims appended hereto.

Figure 10:
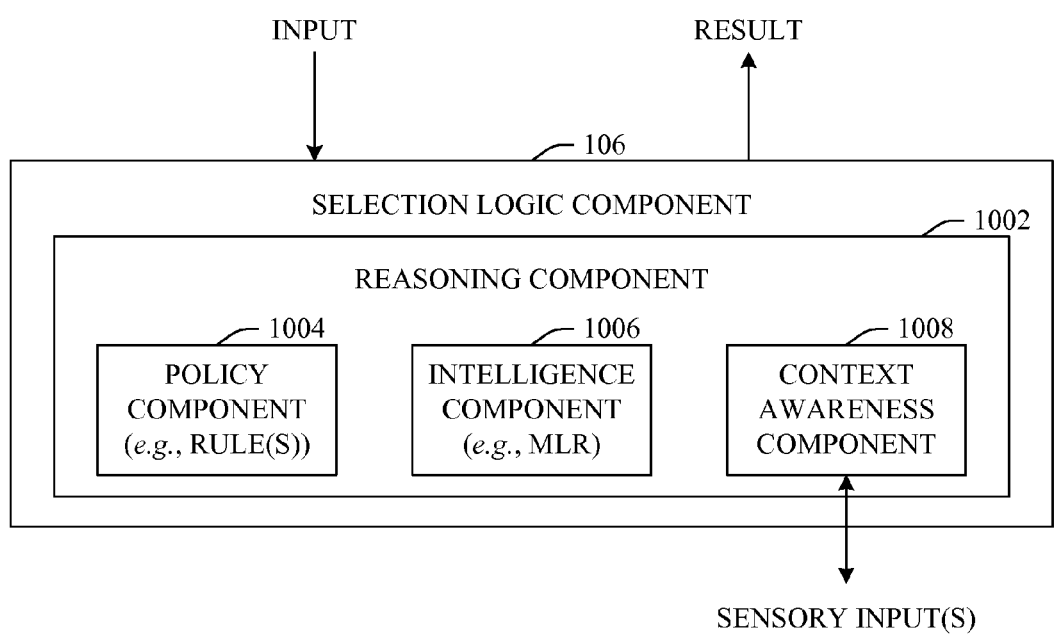
FIG. 10 illustrates a block diagram of a selection logic component having a policy component, an intelligence component and a context awareness component in accordance with an aspect of the innovation.

Turning now to FIG. 10, an example selection logic component 106 is shown having a reasoning component 1002 therein. As illustrated, the reasoning component 1002 includes a policy component 1004, an intelligence component 1006 and a context awareness component 1008. Each of these components enable intelligent and sophisticated selection, pre-selection or generation of a tailored message as a function of factors such as, caller identity, callee identity, context, priority, or the like.

The policy component 1004 can include programmed or pre-programmed implementation schemes and/or preferences which can be used to determine which message to render based upon a set of given factors. In accordance with this policy component 1004, an implementation scheme (e.g., rule) can be applied to define and/or implement selection criterion. It will be appreciated that rule-based implementations can automatically and/or dynamically select messages based upon the set of current factors. In operation, the rule-based implementation can analyze the criteria by employing a predefined and/or programmed rule(s) based upon most any desired scheme.

Still further, a rule can be established to select a particular message based upon presence of a contact (e.g., caller) within the user's personal information manager (PIM) data. In other examples, contact ratings (e.g., rankings, associations) can be employed to select messages. Still further, contextual factors can be considered in connection with message selection. Aspects that employ these contextual awareness factors will be described in greater detail infra.

Referring to the PIM data example, the system can, based upon entries within the PIM data, determine other users within close proximity of a callee. Thus, if the incoming communication is 'urgent' or otherwise deemed appropriate, an automated message can be generated and delivered that identifies alternative ways to reach the callee (e.g., by calling those within close proximity). It is to be understood that, in aspects, these messages can be dynamic and can automatically change based upon a user's context and/or availability, among other factors.

The reasoning component 1002, in one example, can employ MLR schemes to automate one or more features in accordance with the subject innovation. The subject innovation (e.g., in connection with identity determination or message selection) can employ various MLR-based schemes for carrying out various aspects thereof. For example, a process for determining which message to render can be facilitated via an automatic classifier system and process.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria what message to render, what identity to apply based upon a set of contextual factors, etc.

The context awareness component 1008 can be employed to assist in message selection as a function of context. For example, the context awareness component 1008 can automatically determine context associated with the caller, callee, or either devices associated therewith. By way of more specific example, global positioning system (GPS) technology can be employed to determine the location of a user. This location information can be used to automatically select a message based upon callee (or caller) location. Other contextual examples can factor in motion of either party (e.g., via accelerometer), time of day, date, engaged activity, users within proximity, scheduled appointments (e.g., PIM data), or the like. These, among other, factors can be employed by the contextual awareness component 1008 to automatically determine which message to render as a function of a particular situation, environment, condition, or the like.

Figure 11:
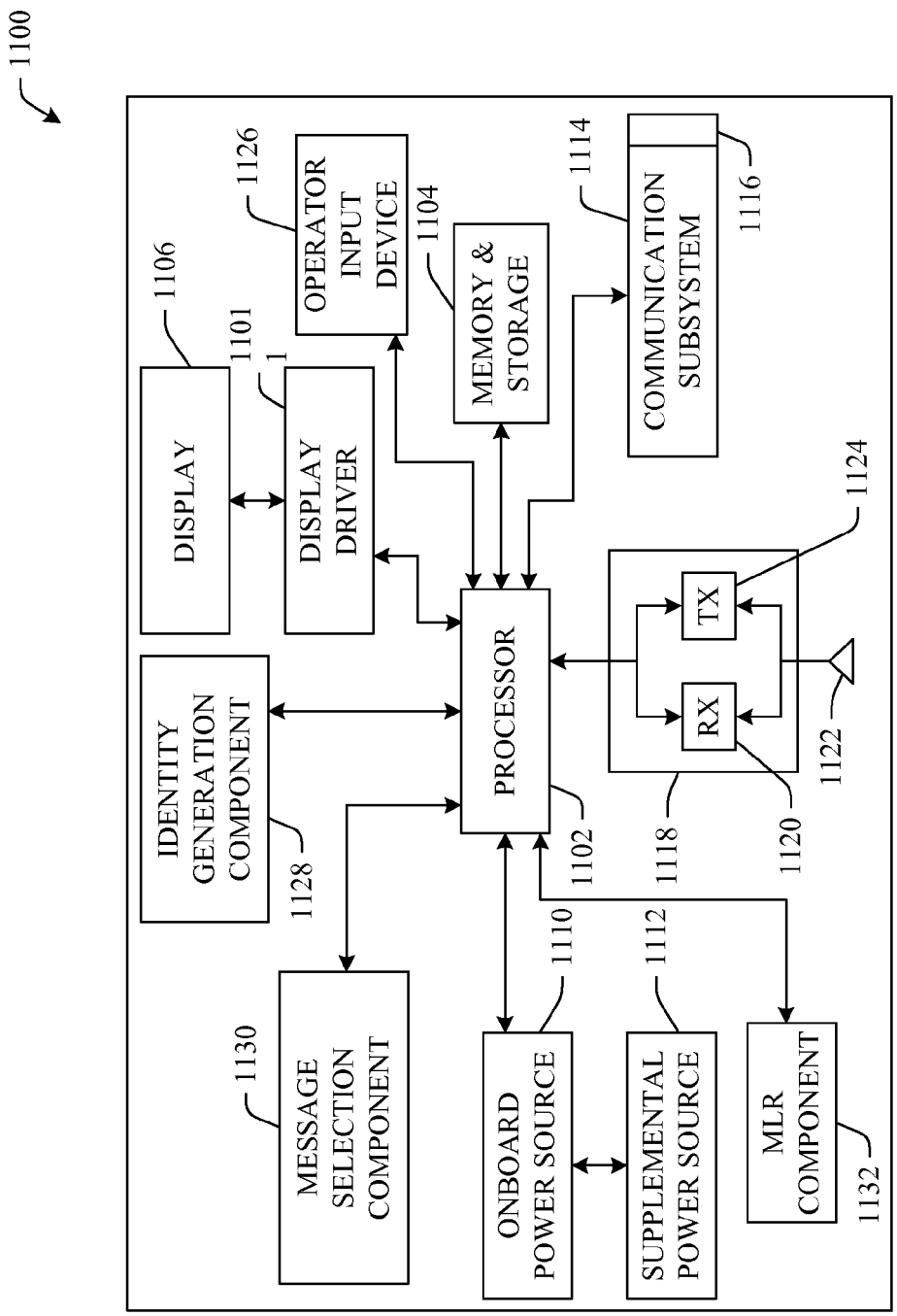
FIG. 11 illustrates an example mobile device that employs an identity determination component, a message selection component and an optional machine learning & reasoning (MLR) component that automates one or more features in accordance with an embodiment of the innovation.

Referring now to FIG. 11, there is illustrated a schematic block diagram of a portable device 1100 according to one aspect of the subject innovation, in which a processor 1102 is responsible for controlling the general operation of the device 1100. It is to be understood that the portable device 1100 can be representative of most any portable device including, but not limited to, a cell phone, smartphone, PDA, a personal music player, image capture device (e.g., camera), personal game station, etc. By way of example, portable device 1100 can be a device such as a VoIP phone that supports SIP as a user agent. In other examples, the device can be a set top box (e.g., Xbox Live-brand device as an example) which is a SIP user agent, and does not necessarily have a RF or keypad.

The processor 1102 can be programmed to control and operate the various components within the device 1100 in order to carry out the various functions described herein. The processor 1102 can be any of a plurality of suitable processors. The manner in which the processor 1102 can be programmed to carry out the functions relating to the subject innovation will be readily apparent to those having ordinary skill in the art based on the description provided herein.

A memory and storage component 1104 connected to the processor 1102 serves to store program code executed by the processor 1102, and also serves as a storage means for storing information such as data, services, metadata, device states or the like. As well, in other aspects, the memory and storage component 1104 can be a stand-alone storage device or otherwise synchronized with a cloud or disparate network-based storage means (e.g., Exchange server), thereby establishing a local on-board storage.

The memory 1104 can be a non-volatile memory suitably adapted to store at least a complete set of the information that is acquired. Thus, the memory 1104 can include a RAM or flash memory for high-speed access by the processor 1102 and/or a mass storage memory, e.g., a micro drive capable of storing gigabytes of data that comprises text, images, audio, and video content. According to one aspect, the memory 1104 has sufficient storage capacity to store multiple sets of information relating to disparate services, and the processor 1102 could include a program for alternating or cycling between various sets of information corresponding to disparate services.

A display 1106 can be coupled to the processor 1102 via a display driver system 1108. The display 1106 can be a color liquid crystal display (LCD), plasma display, touch screen display or the like. In one example, the display 1106 is a touch screen display. The display 1106 functions to present data, graphics, or other information content. Additionally, the display 1106 can display a variety of functions that control the execution of the device 1100. For example, in a touch screen example, the display 1106 can display touch selection buttons which can facilitate a user to interface more easily with the functionalities of the device 1100.

Power can be provided to the processor 1102 and other components forming the device 1100 by an onboard power system 1110 (e.g., a battery pack). In the event that the power system 1110 fails or becomes disconnected from the device 1100, a supplemental power source 1112 can be employed to provide power to the processor 1102 (and other components (e.g., sensors, image capture device)) and to charge the onboard power system 1110. The processor 1102 of the device 1100 can induce a sleep mode to reduce the current draw upon detection of an anticipated power failure.

The device 1100 includes a communication subsystem 1114 having a data communication port 1116, which is employed to interface the processor 1102 with a remote computer, server, service, or the like. The port 1116 can include at least one of Universal Serial Bus (USB) and IEEE 1394 serial communications capabilities. Other technologies can also be included, but are not limited to, for example, infrared communication utilizing an infrared data port, Bluetooth™, etc.

The device 1100 can also include a radio frequency (RF) transceiver section 1118 in operative communication with the processor 1102. The RF section 1118 includes an RF receiver 1120, which receives RF signals from a remote device via an antenna 1122 and can demodulate the signal to obtain digital information modulated therein. The RF section 1118 also includes an RF transmitter 1124 for transmitting information (e.g., data, service) to a remote device, for example, in response to manual user input via a user input 1126 (e.g., a keypad) or automatically in response to a detection of entering and/or anticipation of leaving a communication range or other predetermined and programmed criteria.

An identity generation component 1128 can be employed to establish identity of a caller and/or callee. A message selection component 1130 can be employed to evaluate factors related to incoming communications in order to tailor a response message (e.g., voice-mail message). Still further, an optional MLR component 1132 can be employed to automate one or more features of the innovation. As described in greater detail supra, the MLR component 1132 (and/or a rules-based logic component (not shown)) can be used to effect an automatic action of processor 1102. It is to be appreciated that these components can enable functionality of like components (and sub-components) described supra.

While the aspect of FIG. 11 illustrates a hardware-based solution (e.g., a voicemail server in a box for example), it is to be understood that the solution can be a software-only solution as well to be installed on a server (e.g., Windows-brand Server and Office Communications-brand Server) installation. In addition to a computer operable to execute the disclosed architecture, there can be other systems as well. For example, a monitor may not even be necessary if a management console is used to remotely administer the machine.

Figure 12:
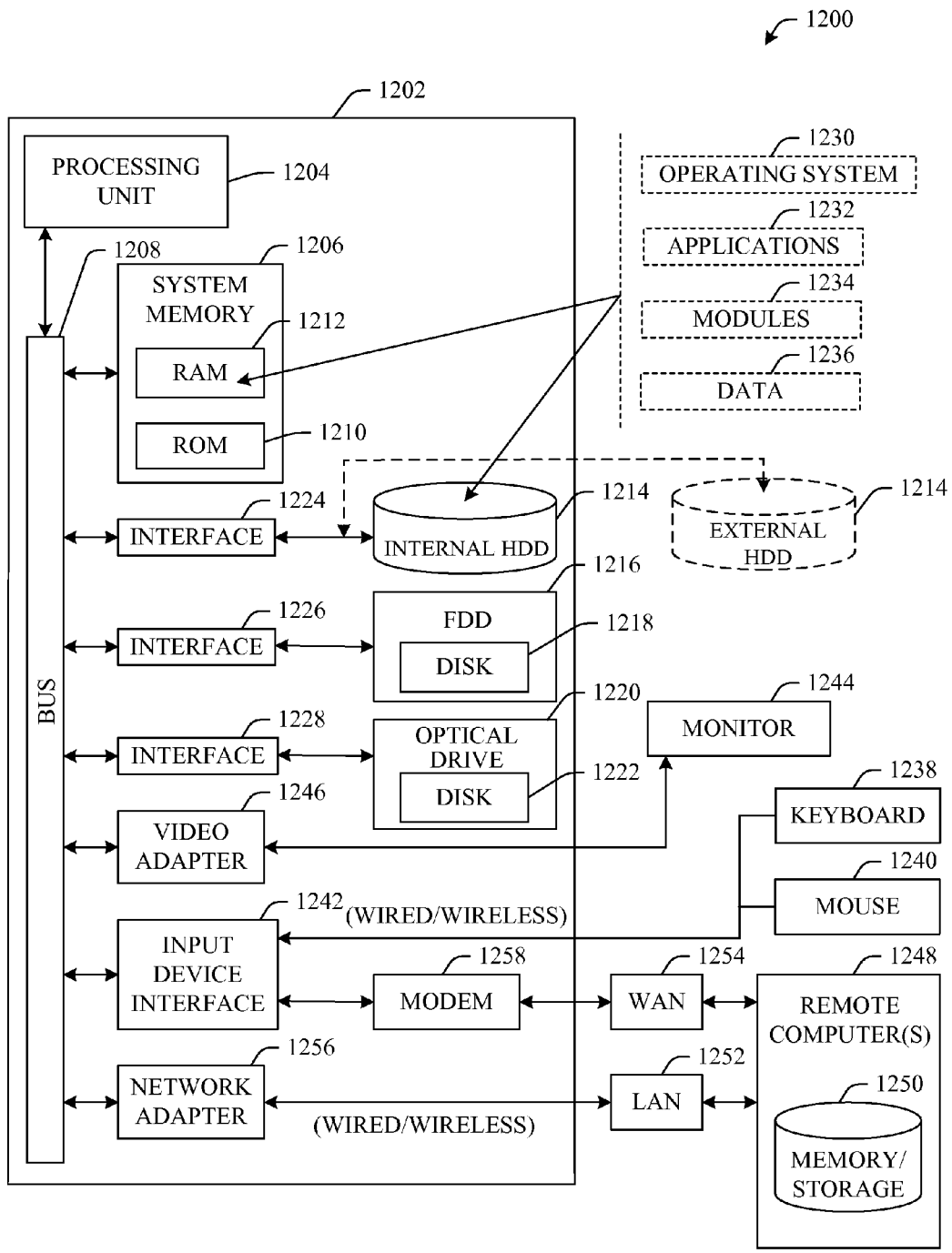
FIG. 12 illustrates a block diagram of a computer operable to execute the disclosed architecture.

Referring now to FIG. 12, there is illustrated a block diagram of a computer operable to execute the disclosed architecture. In order to provide additional context for various aspects of the subject innovation, FIG. 12 and the following discussion are intended to provide a brief, general description of a suitable computing environment 1200 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the exemplary environment 1200 for implementing various aspects of the innovation includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the innovation can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 13:
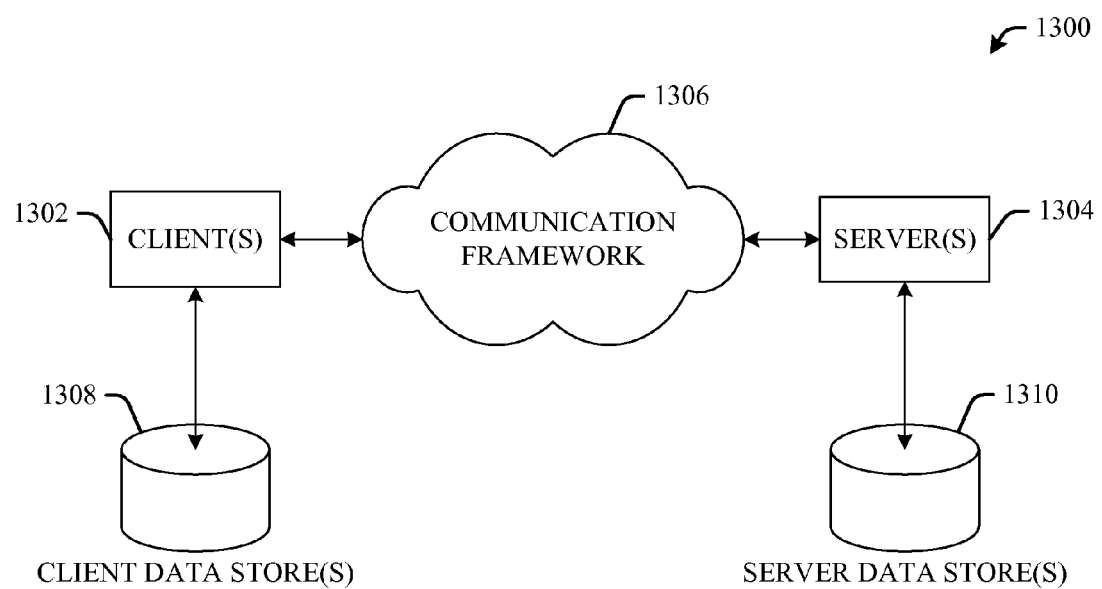
FIG. 13 illustrates a schematic block diagram of an exemplary computing environment in accordance with the subject innovation.

Referring now to FIG. 13, there is illustrated a schematic block diagram of an exemplary computing environment 1300 in accordance with the subject innovation. The system 1300 includes one or more client(s) 1302. The client(s) 1302 can be hardware and/or software (e.g., threads, processes, computing devices). The client(s) 1302 can house cookie(s) and/or associated contextual information by employing the innovation, for example.

The system 1300 also includes one or more server(s) 1304. The server(s) 1304 can also be hardware and/or software (e.g., threads, processes, computing devices). The servers 1304 can house threads to perform transformations by employing the innovation, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system configured to facilitate identity-based response message management, comprising:

a processor and a computer-readable storage medium storing processor-executable instructions of executable components which, in execution, cause the system to facilitate identity-based response message management, the executable components comprising:

an identity generation component, wherein the identity generation component is configured to:

establish an identity of an initiator of a communication from multiple identities associated with the initiator of the communication according to current contextual factors surrounding the initiator; and establish an identity of a target of the communication from multiple identities associated with the target of the communication according to current contextual factors surrounding the target;

wherein the identity of the initiator and the identity of the target differs depending on at least one of the time of day and respective locations of the initiator and the target; and a message selection component configured to tailor a message to the initiator as a function of the established identity of the initiator and the established identity of the target, dynamic contextual information of the initiator and the target, and in view of call criteria comprising a priority associated with the communication by the initiator of the communication.

2. The system of claim 1, wherein the message selection component is configured to employ the identity of the target to tailor the message.

3. The system of claim 1, wherein the communication is a voice call.

4. The system of claim 1, wherein priority associated with the communication of the call criteria is one of "normal", "business" or "urgent".

5. The system of claim 1, the executable components further comprising an analysis component configured to evaluate a header of the communication, wherein the header is configured to identify the call criteria.

6. The system of claim 5, wherein the analysis component is configured to employ at least one of a container list to establish a container identification as a function of the identity of the target, a category list to establish a category identification as a function of call criteria or a callee list to establish a callee identification as a function of the identity of the initiator, the message selection component being configured to employ at least one of the container identification, the category identification or the callee identification to establish a tailored message.

7. The system of claim 6, wherein the container list includes a cross-reference of a plurality of masks, types and containers configured to assist in identification of the container identification.

8. The system of claim 6, wherein the category list includes a cross-reference of a plurality of category designations and category names configured to assist in identification of the category identification.

9. The system of claim 6, wherein the callee list includes a plurality of callee designations and masks configured to assist in identification of the callee identification.

10. The system of claim 1, the executable components further comprising a selection logic component configured to employ at least one of a container identification, a category identification or the callee identification to establish a tailored message.

11. The system of claim 10, wherein the selection logic is configured to employ a message list and a result table to tailor the message.

12. The system of claim 11, wherein the message list includes a cross-reference of a plurality of messages, audio files and text strings configured to assist in generation of the tailored message.

13. The system of claim 11, wherein the result table includes a cross-reference of a plurality of category designations, containers, callee identifications, and messages configured to assist in selection of the tailored message.

14. The system of claim 10, the executable components further comprising a reasoning component that includes at least one of a policy component, an intelligence component or a context awareness component configured to effect selection of the tailored message.

15. A computer-implemented method of managing response messages, the computer-implemented method comprising:
executing computer-executable instructions that, when executed, cause operations to be performed comprising:
receiving an incoming Voice Over Internet Protocol (VoIP) communication from a caller to a callee;
determining an identity of the caller from multiple identities associated with the caller based, at least, on whether a device from which the VoIP communication originates is owned by the caller or owned by an enterprise;
determining an identity of the callee from multiple identities associated with the callee;
evaluating a priority of the incoming VoIP communication, the priority of the incoming VoIP communication being established by the caller; and
selecting a response message based upon the identity of the caller and the identity of the callee, dynamic contextual information of the callee comprising at least one of the time of day and location of the caller and the callee, and the priority of the incoming VoIP communication.

16. The computer-implemented method of claim 15, further comprising analyzing a header of the communication to establish the priority.

17. One or more computer storage media, not including signals, and having instructions stored thereon that, when executed by a processor, cause the processor to perform operations comprising:
receiving an incoming communication;
establishing an identity of the caller from multiple identities of the caller;
establishing an identity of the callee from multiple identities of the callee;
establishing dynamic contextual information of the callee comprising at least one of the time of day and the respective locations of the caller and callee;
establishing a priority of the incoming communication as associated with the incoming communication by the caller; and
selecting a voicemail message from a plurality of voicemail messages, the selecting being based upon a relationship between the identity of the caller, the identity of the callee, the dynamic contextual information of the callee, and the priority.

18. The one or more computer storage media of claim 17, having further instructions stored thereon that, when executed by the processor, cause the processor to perform further operations comprising programming the relationship in accordance with a preference of a user.

19. The one or more computer storage media of claim 17, having further instructions stored thereon that, when executed by the processor, cause the processor to perform further operations comprising inferring the relationship based upon contextual awareness.

* * * * *